Feb. 13, 1968 W. V. CORNETT 3,368,764
SCRAP METAL BREAKER
Filed Nov. 18, 1964 5 Sheets-Sheet 3

INVENTOR.
WALTER V. CORNETT
BY
Bierman + Bierman
ATTORNEYS

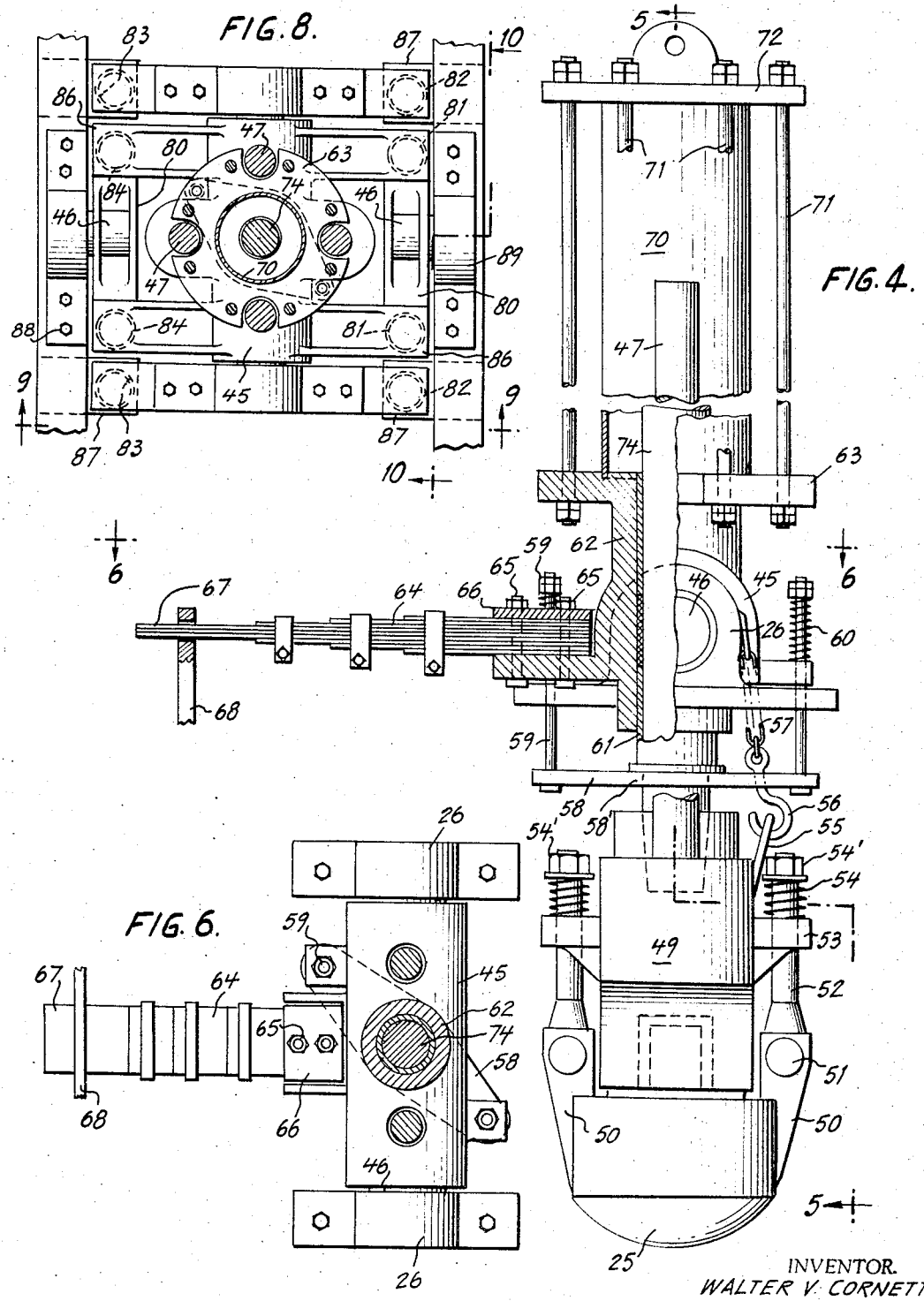

Feb. 13, 1968  W. V. CORNETT  3,368,764
SCRAP METAL BREAKER
Filed Nov. 18, 1964  5 Sheets-Sheet 5

INVENTOR.
WALTER V. CORNETT
BY
Bierman + Bierman
ATTORNEYS

United States Patent Office

3,368,764
Patented Feb. 13, 1968

3,368,764
SCRAP METAL BREAKER
Walter V. Cornett, 2751 E. 11th St.,
Los Angeles, Calif. 90023
Filed Nov. 18, 1964, Ser. No. 412,010
13 Claims. (Cl. 241—270)

ABSTRACT OF THE DISCLOSURE

A scrap metal breaker comprising a floor with a base thereon and a bridge pivoted on the base and extending laterally, the free end of the bridge being supported on rollers and capable of being propelled around in a circle, a hammer mounted on the bridge by a carriage capable of moving along the bridge and means for causing the hammer to reciprocate vertically.

---

The present invention is directed to apparatus for breaking up scrap metal, such as damaged, destroyed or obsolete machinery.

Various methods have been used for this purpose, ranging from hand operations to complex machines. It has also been proposed to crush scrapped automobiles, for example, by pressing them in hydraulic presses. Such apparatus is complicated and expensive, and is slow in its operation as it is necessary to remove the crushed auto, usually by physical exertion, and then replace it by other autos, also by manual labor, into the press. Machines for breaking scrap metal have been used with more or less success. Some such machines were mobile, while others operated from fixed bases.

The present invention is intended and adapted to provide an improved apparatus of the fixed base type, which is capable of heavy duty without undue vibration of the structure, so that it has a long life with a minimum of repairs.

It is also among the objects of the invention to provide an apparatus of the character described which is so located and so operated that large quantities of metal may be scrapped in a short time thereby.

In practicing the invention, there is provided a base on which a bridge is mounted so as to be rotatable over 360°. The outer end of the bridge has a self-driven carriage which propels the bridge in an arcuate path. A hammer carriage is mounted on the bridge and is adapted to be propelled along the bridge by motor means mounted on the bridge and operated by a compressed air motor. An important feature of the invention is the construction of the hammer, the holder for the hammer, and the resilient elements which prevent undue shocks to the carriage and associated aparatus, while at the same time not interfering with the operation of the machine or lessening its impacts.

The invention is more fully described in connection with the accompanying drawings, in which like reference characters indicate like parts, and in which:

FIG. 4 is an enlarged vertical cross-sectional view some parts being shown in elevation of the cylinder arrangement and its association which the hammer and hammer holder;

FIG. 6 is a fragmentary top plan view of a leaf spring arrangement adapted to keep the hammer in a vertical position under all kinds of operating conditions, and taken along line 6—6 of FIG. 4;

FIG. 8 is a top plan view of a modified form of mounting for the hammer on its carriage embodying coil spring shock absorbers, some parts being shown in section;

Figure 1:
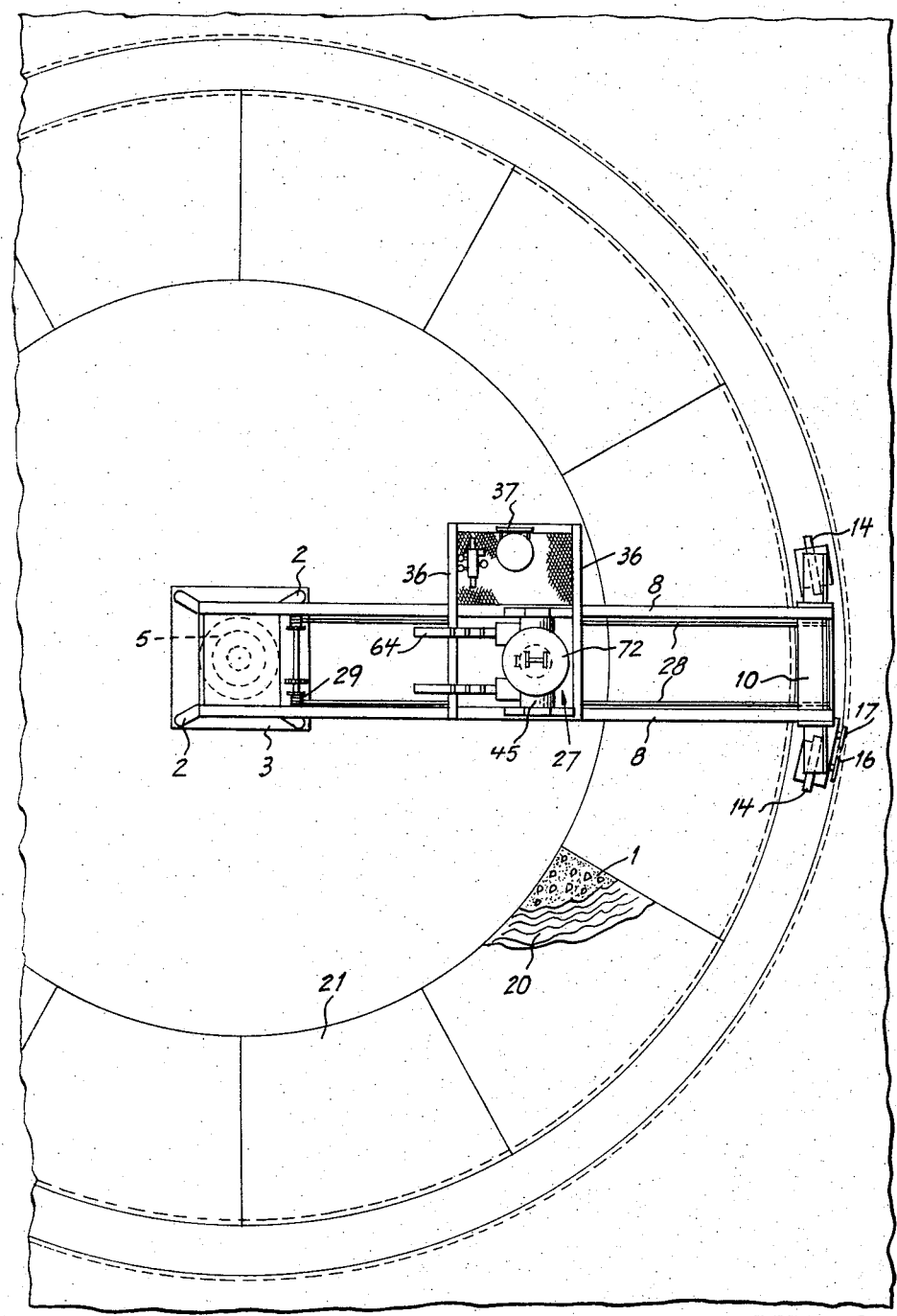
FIG. 1 is a top plan view of an apparatus made in accordance with the invention and indicating the area over which it may operate.
Figure 2:
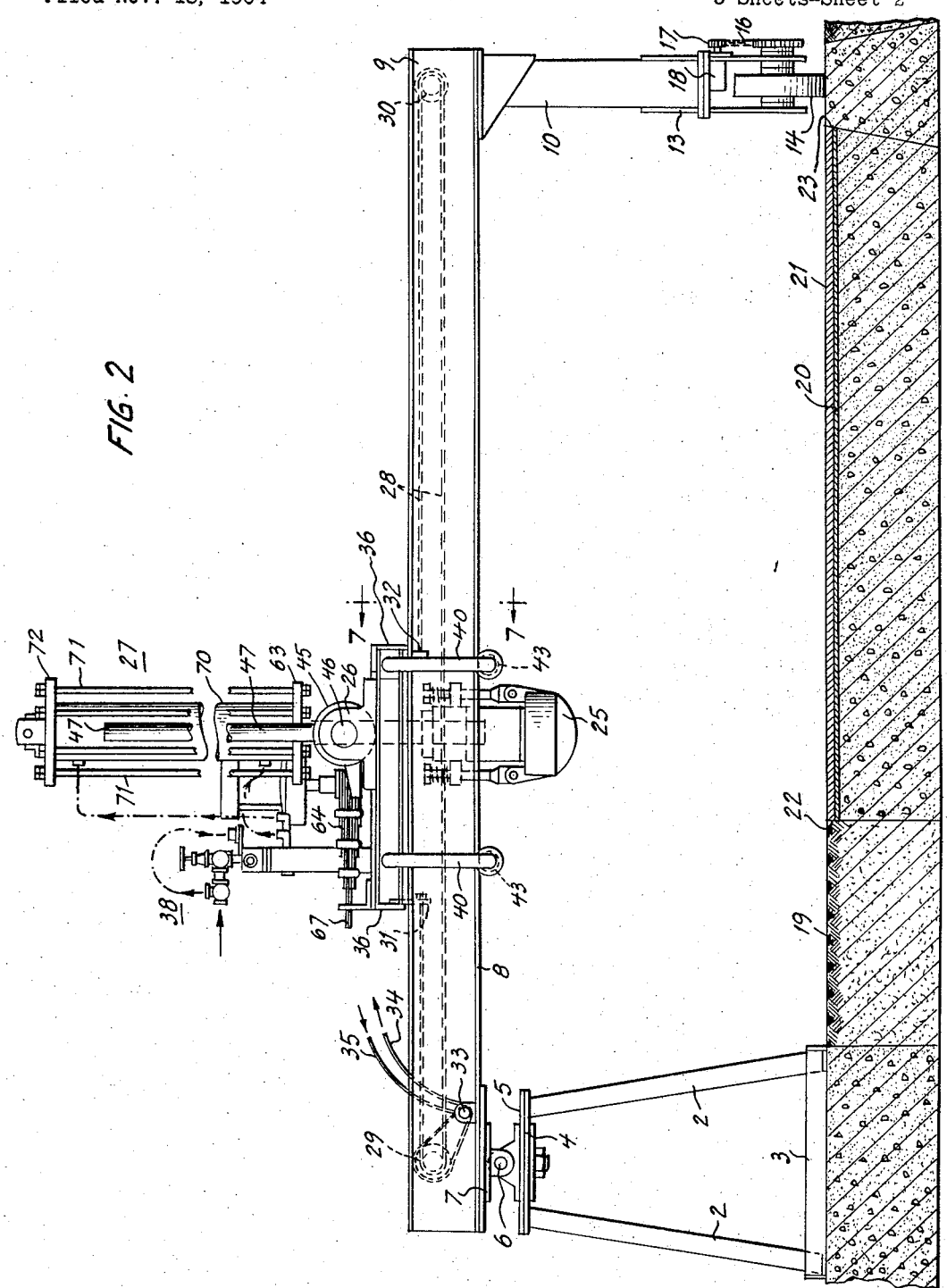
FIG. 2 is a side elevational view thereof, some parts being in section and indicating the relative positions of the essential features.

Referring to the drawings, the floor 1 may be of any suitable type, but preferably it has a base of concrete. Upon this floor is fixed a base 2 consisting of inclined columns connected by bottom frame 3 and having plate 4 at the top joining the columns. Plate 5 on plate 4 constitutes a turntable and it has journal 6 connected to plate 7 secured to one end of bridge 8 consisting of a pair of spaced, parallel I-beams suitably joined together.

At the other end 9 of bridge 8 is a support 10, which is an A-frame having inclined columns 11 joined together by cross-beams 12. At the ends of the A-frame are depending legs 13, bearing wheels 14 in front-to-rear alinement. Pulley 15 on one of said wheels is connected by belt 16 to pulley 17 connected to motor 18 which is preferably air driven.

On floor 1 is an annular layer 20 of plywood to act as a cushion and this is covered by an annular pad of steel or the like on which the material to be crushed will be placed. The pad may be in sections and the top thereof is on the same level as concrete 19 at end 22 and as concrete 24 at end 23 thereof.

Hammer 25 is suspended between beams 8 thru suitable mechanism, described below from hammer carriage 26, which in turn carries pneumatic operating arrangement 27. The carriage 26 is connected by cable 28 passing over drum 29 at one end of the bridge and over drum 30 at the other end. One end of cable 28 is attached to carriage 26 at 31 and the other end of cable 28 is attached at 32 to the other end of carriage 26. Operating means for rotating drum 29 is thru pulleys and belt to compressed air motor 33, actuated thru tubes 34 and 35. Extension 36 on carriage 26 carries seat 37 for the operator who handles control 38 of the various pneumatic elements in the functioning of the machine.

In order to move carriage 26 and to keep it stable during the crushing operation there is provided a pair of frames embracing beam 8. Each frame consists of depending plates 40 and 41, the lower end of the frame having a roller 43 contacting the lower face of the I-beam 8. Similarly, at the upper end of the plates a roller 44 is journalled, and it rests on the upper face of the I-beam. Such structure fully stabilizes the carriage and holds it steady under heavy pounding of the hammer.

Figure 5:
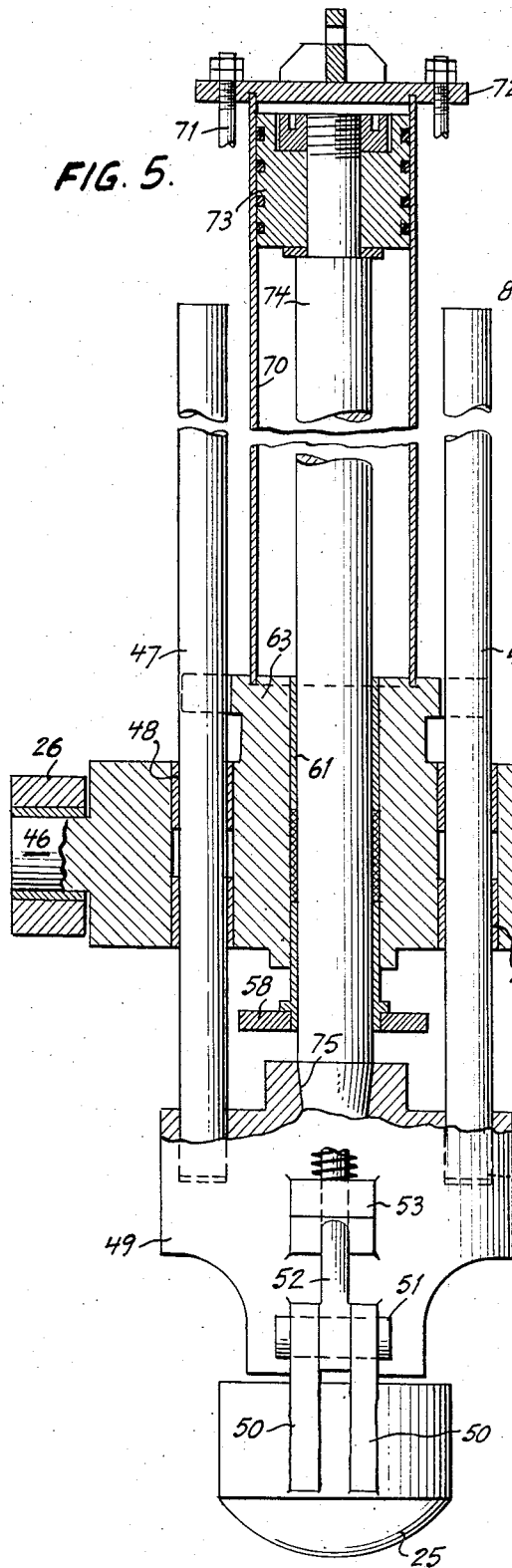
FIG. 5 is a still further enlarged vertical cross-sectional view of the cylinder and associated parts and illustrating the mounting thereof on a trunnion.

The mounting of the hammer cylinder is best illustrated in FIGS. 4 and 5. Trunnion 45 is mounted in hammer carriage 26 by pivots 46 to affect limited oscillation of the cylinder during the crushing operation. Guide rods 47 pass thru holes in trunnion 45 lined with bushings 48, the lower ends of said rods being anchored in block 49, which is the holder for the hammer. A pair of eye-bars or bolts 50 is welded to opposite sides of hammer 25 and pin or pivot 51 passes thru each of the eyes and thru the eye of eye-bar 52, the upper end of which passes thru wing 53 of holder 49 and is resiliently held onto said holder by spring 54 interposed between the upper face of wing 53 and nut 54'. An eye 55 is fixed onto the top portion of holder 49 and hook 56 thereon is attached by short chain 57 to trunnion 45.

Plate 58 has a central opening 58' thru which the piston rod is passed. Bolts 59 pass thru trunnion 45 and a spring mounted on said trunnion by spiral spring 60. Bushing 61 in body 62 acts as a bearing for the piston rod. Flange 63 on body 62 supports the hammer cylinder.

In order to steady the cylinder and keep the hammer vertical, there is provided a multiple leaf spring 64, the inner end of which is anchored to trunnion 45 by bolts 65 passing thru it and thru plate 66. The outer end of spring 64 passes thru a slot in the upper end 67 of slanted angle plate 68 fixed on carriage 26.

Figure 3:
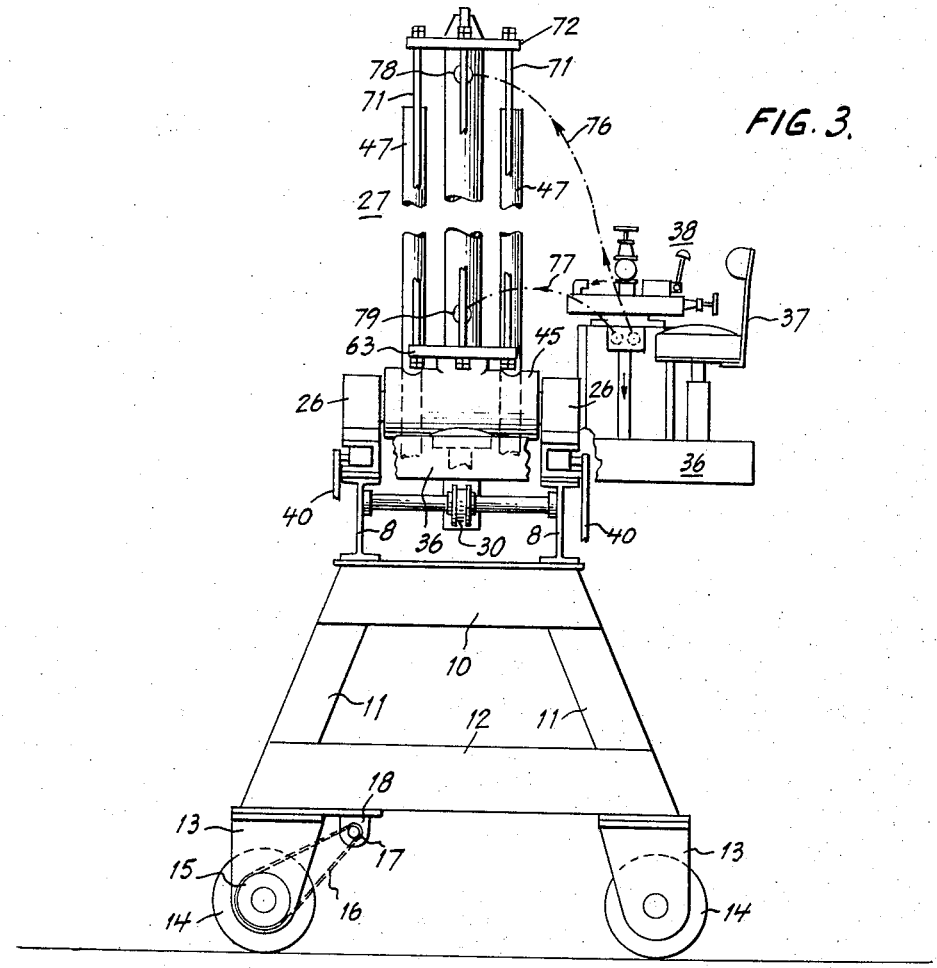
FIG. 3 is an end elevational view showing the character of the means for propelling the bridge.
Figure 7:
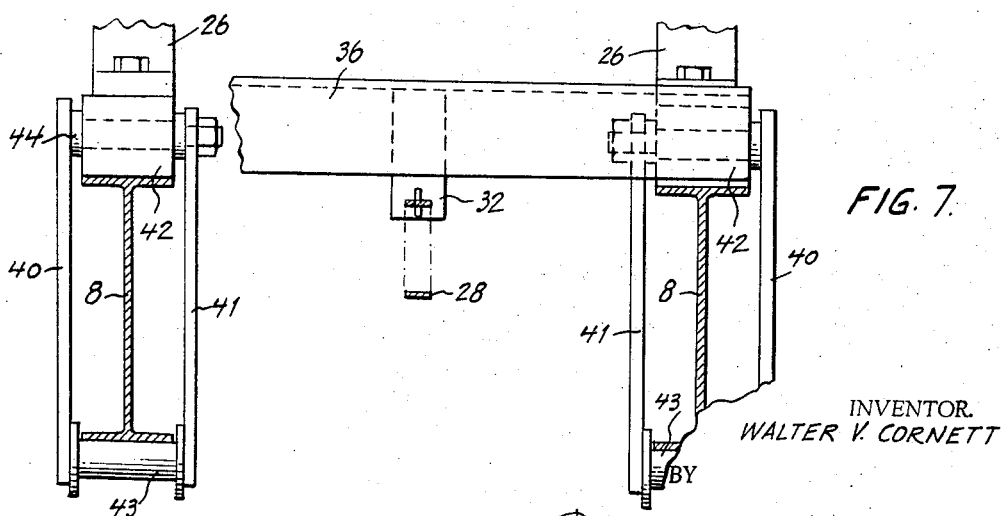
FIG. 7 is a cross-sectional view taken along line 7—7 of FIG. 2, illustrating the means for mounting the hammer carriage on the bridge to maintain stability of the carriage during heavy duty.

Hammer cylinder 70 is anchored to trunnion 45 by bolts 71 passing thru cap 72 of cylinder 70 and flange 63. Piston 73 has its rod 74 seen diagrammatically in FIG. 3, pneumatic connection 76 and 77 from control panel 38 lead to the top and bottom of the cylinder thru parts 78 and 79, respectively, for reciprocating the piston rod.

Figure 9:
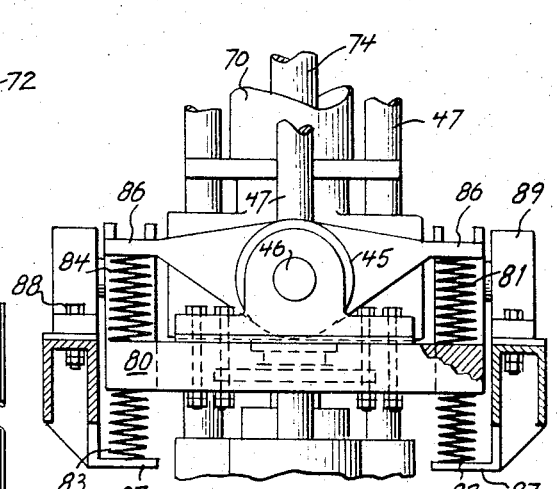
FIG. 9 is a side elevational view of the modification of FIG. 8, some parts being shown in section.
Figure 10:
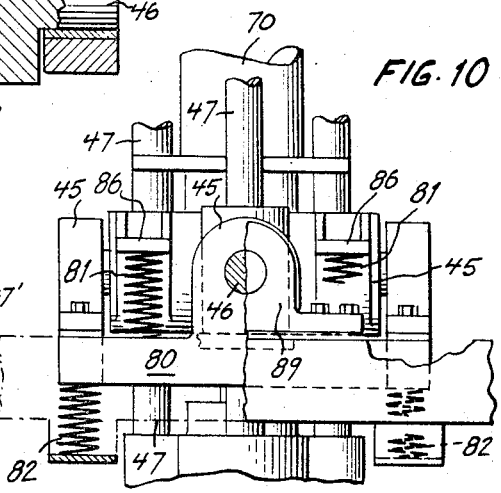
FIG. 10 is a side elevational view thereof taken at right angles to the view shown in FIG. 9.

FIGS. 8 to 10 illustrate a different mechanism for mounting the hammer resiliently on the trunnion. On plate 80 which is the hammer holder, there are sets of springs 81, 82, 83 and 84 alternately on opposite sides of plate 80. They are held between wings 86 of trunnion 45 and brackets 87 bolted at 88 to member 89. By the spacing and number of these springs, the hammer is perfectly balanced and kept in operative position at all times during operations.

In the operation, a machine to be scrapped is placed on pad 21, bridge 8 is swung around journal 6 by rotating bridge carriage 10 thru wheel 14. Then hammer carriage 26 is moved radially by shifting it thru cable 28 and motor 33 until it is over the machine to be scrapped. Then the hammer is reciprocated thru piston rod operation by controls 38 thru cylinder 70, giving successive blows to scrap the material. Meanwhile, other mechanism to be scrapped are placed at various points on the annular pad, and now the bridge is swung over such mechanisms and the operation conducted without loss of time. At this stage the crushed mechanism is removed and fresh material is put in position for scrapping.

While the invention has been described with two embodiments thereof, the invention is broader than such examples. Various changes in the details of the structural features are contemplated. For instance, other resilient mountings for the hammer are feasible, the important feature being the conception of the idea. The carriage and also the bridge may be propelled by means other than those described herein. Also, the stabilization of the hammer carriage may be obtained by equivalent mechanisms. These and other changes may be made in mechanical arrangements, and the invention is, therefore, to be construed broadly and not to be limited except by the character of the claims appended hereto.

What is claimed is:

1. A scrap metal breaker comprising a floor, a base fixed on said floor and extending a substantial distance above said floor, a bridge having one end pivoted on the upper end of said base and extending laterally from said base for horizontal arcuate movement, a support depending from the free end of said bridge, the lower end of said support being in contact with said floor, means adjacent to the lower end of said support for propelling said bridge on said floor in an arc about said pivot, a hammer carriage mounted on said bridge with means for propelling the same along said bridge, means mounted on said carriage for reciprocating a hammer, said hammer being suspended from said reciprocating means and being below said bridge, and a connection between said hammer and said reciprocating means, whereby vertical motion may be imparted to said hammer.

2. A scrap metal breaker according to claim 1 characterized in that shock absorber means are interposed between said hammer and said suspension.

3. A scrap metal breaker according to claim 2 characterized in that said shock absorber includes a plurality of coil springs.

4. A scrap metal breaker according to claim 1 characterized in that a metal breaking pad on said floor is located between said base and said bridge support, a concrete foundation under said pad, and a plywood layer interposed between said pad and foundation.

5. A scrap metal breaker according to claim 1 characterized in that a turntable on said base and a cooperating member on said bridge constitute a pivot for said bridge.

6. A scrap metal breaker according to claim 1 characterized in that said bridge carriage has a pair of wheels in alinement and the propelling means for said bridge carriage is connected to one of said wheels.

7. A scrap metal breaker according to claim 1 characterized in that a metal breaking pad on said floor is located between said base and said bridge support, and said pad is annular.

8. A scrap metal breaker according to claim 1 characterized in that a turntable on said base and a cooperating member on said bridge constitute a pivot for said bridge and a horizontal journal between said base and bridge allow vertical movement of said bridge.

9. A scrap metal breaker according to claim 1 characterized in that said bridge carriage has a pair of wheels in alinement and the propelling means for said bridge carriage is connected to one of said wheels, said means including a pneumatic motor.

10. A scrap metal breaker according to claim 1 characterized in that a pair of spaced frames depending from said hammer carriage embrace said beams.

11. A scrap metal breaker according to claim 1 characterized in that a pair of spaced frames depending from said hammer carriage embrace said beams, rollers journalled in said frames and in operative relation with top and bottom of said beams.

12. A scrap metal breaker according to claim 1 characterized in that a vertical pneumatic cylinder on said hammer carriage, a piston in said cylinder, a piston rod connected to said hammer.

13. A scrap metal breaker according to claim 1 characterized in that a vertical pneumatic cylinder on said hammer carriage, a piston in said cylinder, a piston rod connected to said hammer, pneumatic controls for said cylinder mounted on said hammer carriage for operation of said piston.

References Cited

UNITED STATES PATENTS

| | | | |
|---|---|---|---|
| 2,335,171 | 11/1943 | Cornett | 173—28 |
| 2,627,880 | 2/1953 | Johnson | 143—6 |
| 2,628,453 | 2/1953 | Pye et al. | 225—103 |
| 2,723,803 | 11/1955 | Cornett | 241—270 |

ANDREW R. JUHASZ, *Primary Examiner.*